United States Patent
Wochele

(10) Patent No.: US 7,436,159 B1
(45) Date of Patent: Oct. 14, 2008

(54) COMPOUND POWER SUPPLY

(75) Inventor: Fritz Wochele, Aidlingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/060,183

(22) Filed: Mar. 31, 2008

(51) Int. Cl.
*G05F 1/40* (2006.01)
(52) U.S. Cl. .................... 323/273; 323/282
(58) Field of Classification Search .......... 323/265, 323/273, 274, 280, 282, 284, 351
See application file for complete search history.

(56) References Cited

U.S. PATENT DOCUMENTS

| | | | | |
|---|---|---|---|---|
| 4,881,023 A | * | 11/1989 | Perusse et al. | 323/266 |
| 5,309,082 A | * | 5/1994 | Payne | 323/270 |
| 5,592,072 A | * | 1/1997 | Brown | 323/268 |
| 5,773,966 A | * | 6/1998 | Steigerwald | 323/284 |
| 5,864,225 A | * | 1/1999 | Bryson | 323/268 |
| 5,959,443 A | * | 9/1999 | Littlefield | 323/287 |
| 6,636,023 B1 | * | 10/2003 | Amin | 323/268 |
| 6,825,725 B1 | | 11/2004 | Doherty et al. | |
| 7,319,311 B2 | | 1/2008 | Nishida | |
| 2002/0043963 A1 | * | 4/2002 | Malik et al. | 323/276 |
| 2007/0139025 A1 | | 6/2007 | Vinn et al. | |
| 2007/0262448 A1 | | 11/2007 | Ishino | |
| 2007/0290666 A1 | | 12/2007 | Hachiya | |

FOREIGN PATENT DOCUMENTS

| | | |
|---|---|---|
| WO | WO 2006/016516 | 2/2006 |
| WO | WO 2006/126639 | 11/2006 |

* cited by examiner

*Primary Examiner*—Adolf Berhane
(74) *Attorney, Agent, or Firm*—McGinn IP Law Group, PLLC; Kristian J. Urbahn, Esq.

(57) ABSTRACT

A power supply configured to receive and provide a 10V input, 5V output with a continuous load of 1 A load current and a pulse load duration of 2 ms and a pulse load of 10 A load current including a switching regulator configured to provide a continuous current, the switching regulator comprising a current limit of 1.2 A, a linear regulator associated with the switching regulator, and a control circuit configured to direct the linear regulator to provide a minimal current when the power supply is at a continuous load, and to direct the linear regulator to provide a remaining portion of a pulse load current from the continuous load of the switching regulator. The control circuit, in a condition that a noise-free mode is demanded, deactivates the switching regulator and directs the linear regulator to provide the continuous current.

1 Claim, 5 Drawing Sheets

200

COMPOUND POWER SUPPLY

BACKGROUND OF THE INVENTION

1. Field of the Invention

The present invention generally relates to a method and apparatus for regulating power and more particularly to a method and apparatus for regulating electrical power for a pulse load.

2. Description of the Related Art

Typically, a switching regulator (SR) is provided to supply power for a continual load with occasional high demand, pulse loads. Examples of devices that present a continual load with occasional pulse loads include a periodically-controlled stepper motor and its control logic when operated from the same power supply. Another application is related to the control of large DC contacts which demand a high initial current and low hold current.

In a power supply configured to receive and provide a 10V input, 5V output, with a continuous load of 1 A and a pulse load duration of 2 ms and pulse load of 10 A may be required. However, such an SR is impracticable because, due to the relative long pulse load of 2 ms, the SR would have to be dimensioned for the pulse load of 10 A. Energy storage devices would be much too large and costly to provide the pulse load. On the other hand, a linear regulator (LR) cannot be considered since the efficiency would be less than 50% and high heat losses would accrue.

SUMMARY OF THE INVENTION

In view of the foregoing, and other, exemplary problems, drawbacks, and disadvantages of the conventional systems, it is an exemplary feature of the present invention to provide a structure in which a power supply configured to receive and provide a 10V input, 5V output with a continuous load of 1 A load current and a pulse load duration of 2 ms and a pulse load of 10 A load current, including a switching regulator configured to provide a continuous current, the switching regulator comprising a current limit of 1.2 A, a linear regulator associated with the switching regulator, and a control circuit configured to direct the linear regulator to provide a minimal current when the power supply is at a continuous load and to direct the linear regulator to provide a remaining portion of a pulse load current from the continuous load of the switching regulator. The control circuit, in a condition that a noise-free mode is demanded, deactivates the switching regulator and directs the linear regulator to provide the continuous current.

In another aspect of the present invention, to achieve the above features and purposes, described herein is a power supply including a linear regulator configured to provide a low current when the power supply is at a low continuous load, the linear regulator configured to provide a minimal current when the power supply is at a regular load, the regular load being greater than the low load and less than a pulse load, and the linear regulator being configured to provide a remaining portion of a pulse load current from the continuous load of the switching regulator and a switching regulator configured to provide a continuous current when the power supply is supplying the regular load.

Thus, exemplary embodiments of the present invention can provide a good efficiency because at a continuous load, the switching regulator can provide 95% of the total current. In addition, the advantages of both the switching regulator and the linear regulator, including the good response time and small noise level of the linear regulator. Furthermore, the present invention no longer requires the switching regulator to be dimensioned for the pulse load.

BRIEF DESCRIPTION OF THE DRAWINGS

The foregoing and other purposes, aspects and advantages will be better understood from the following detailed description of a preferred embodiment of the invention with reference to the drawings, in which.

DETAILED DESCRIPTION OF EXEMPLARY EMBODIMENT OF THE INVENTION

Figure 1:
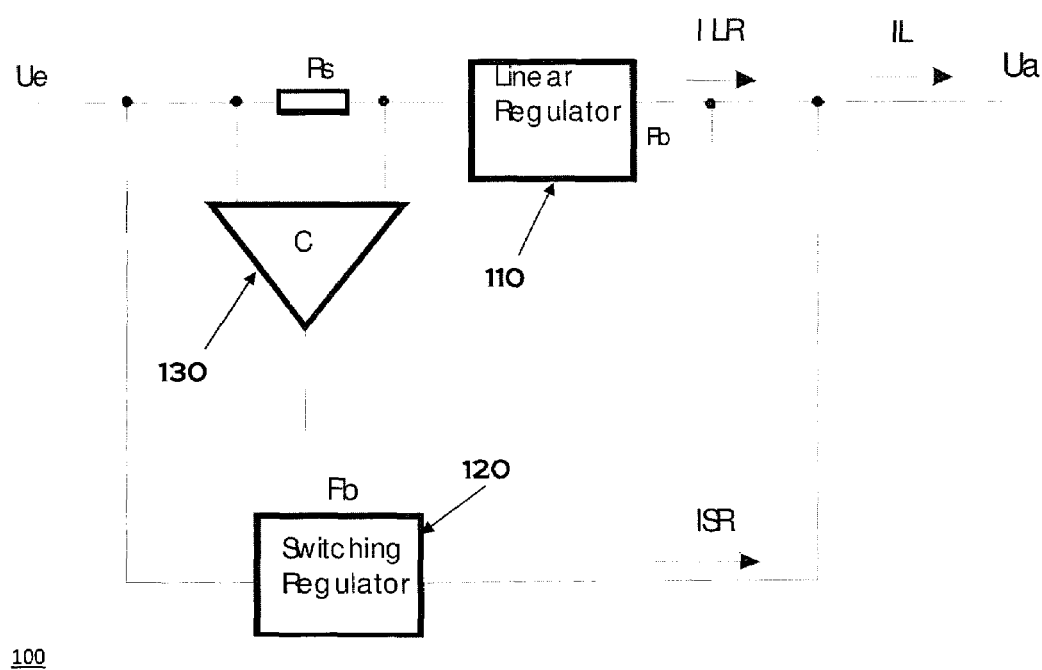
FIG. 1 illustrates an exemplary power supply 100 for providing a continual output and pulse output.

Referring now to the drawings, and more particularly to FIGS. 1-4, there are shown exemplary embodiments of the method and structures according to the present invention.

FIG. 1 illustrates an exemplary power supply 100. Referring to FIG. 1, power supply 100 includes linear regulator 110 and switching regulator 120. Control circuit 130 can be configured to control switching regulator 120.

In exemplary power supply 100, a load current IL is drawn by the external load. Load current IL can include currents from switching regulator 120 and linear regulator 110. That is, both linear regulator current ILR and switching regulator current ISR can make up load current IL from power supply 100.

Power supply 100 can be configured to receive and provide a 10V input, 5V output, with a continuous load of 1 A load current IL and a pulse load duration of 2 ms and pulse load of 10 A load current IL may be required.

Power supply 100 may be configured that during a continuous load, linear regulator 110 supplies a small amount of linear regulator current ILR (in this example about 50 mA). This is achieved by the control circuit 130. Control circuit 130 stimulates input Fb of switching regulator 120 in a way, that at above a certain voltage across Rs, (Rs×50 mA) switching regulator 120 delivers all the difference of current between current IL and linear regulator current ILR. (e.g., 1 A−50 mA=950 mA). Thus, at a continuous load, power supply 100 demonstrates a high efficiency, because switching regulator 120 supplies about 95% of the total current.

The current limit of switching regulator 120 may be set to about 1.2 A. In power supply 100, if the pulse load occurs, switching regulator 120 goes into a current limitation mode and the difference between load current IL and switching regulator current ISR 10 A−1.2 A=8.8 Amps is delivered by linear regulator 110.

Because of the exemplary power supply 100 configuration, switching regulator 120 can be dimensioned for the continuous load only, because linear regulator 110 can provide the remaining portion of load current IL during the pulse load. Therefore, much smaller and cheaper parts can be used to construct, design, and manufacture switching regulator 120. In addition, the linear regulator 110 may be constructed and designed cheaply and easily, especially if linear regulator 110 is expected to deliver high currents only for a short period of time. If the pulse load intervals are small, compared to the continuous load intervals, then the overall efficiency is improved.

In this exemplary configuration linear regulator 110 is always active, which results in a short response time. In some exemplary configurations, however, linear regulator 110 may be switched off during a continuous load and only become active when switching regulator 120 goes into the current limitation mode.

Additionally, in other exemplary power supplies, for example, linear regulator 110 may only supply short load peaks to keep the circuitry effort for switching regulator 120 low.

Figure 2:
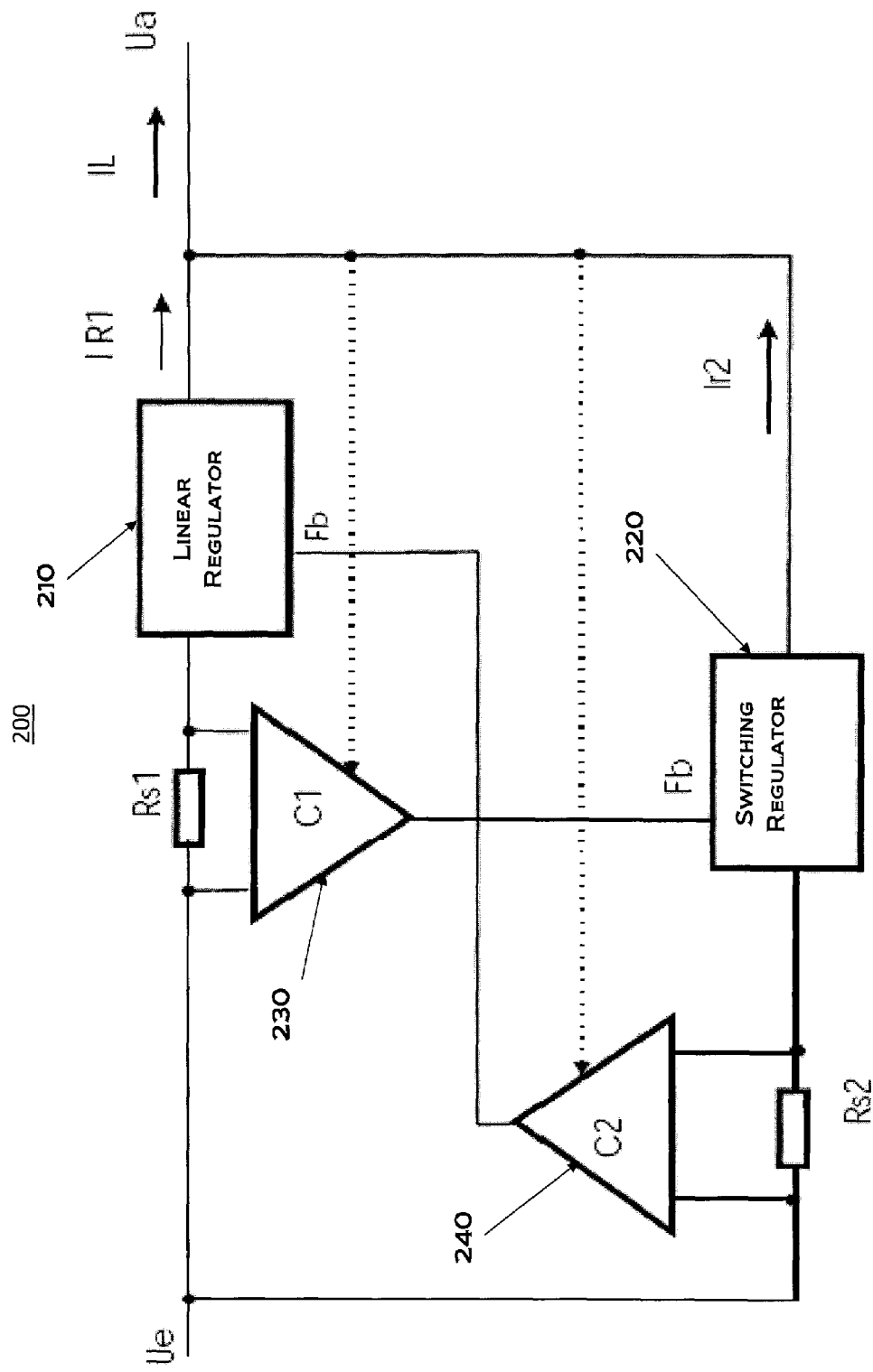
FIG. 2 illustrates an exemplary power supply 200 for providing a continual output and a pulse output.

FIG. 2 is an illustration of exemplary power supply 200. Referring to FIG. 2, power supply 200 includes linear regulator 210 and switching regulator 220. In addition, power supply 200 includes first control circuit 230 and second control circuit 240.

First control circuit 230 can be configured to control linear regulator 210 and second control circuit 240 can be configured to control switching regulator 220.

In power supply 200, at very low continuous load only linear regulator 210 may be active. That is, switching regulator 220 only turns on at a high load as directed by second control circuit 240. This configuration may be helpful for long low load intervals because at continuous load, the output voltage, supplied by linear regulator 210, is virtually free of noise and still has a relatively high efficiency. In addition, the efficiency of switching regulators can be poor for very low loads because for very low loads linear regulators can be more efficient than switching regulators, because switching regulators need more energy to maintain operation. Furthermore, in other exemplary power supplies, where a noise-free environment or output voltage is required, switching regulator 220 can be switched off and the linear regulator 210 can take over all the output current.

Figure 3:
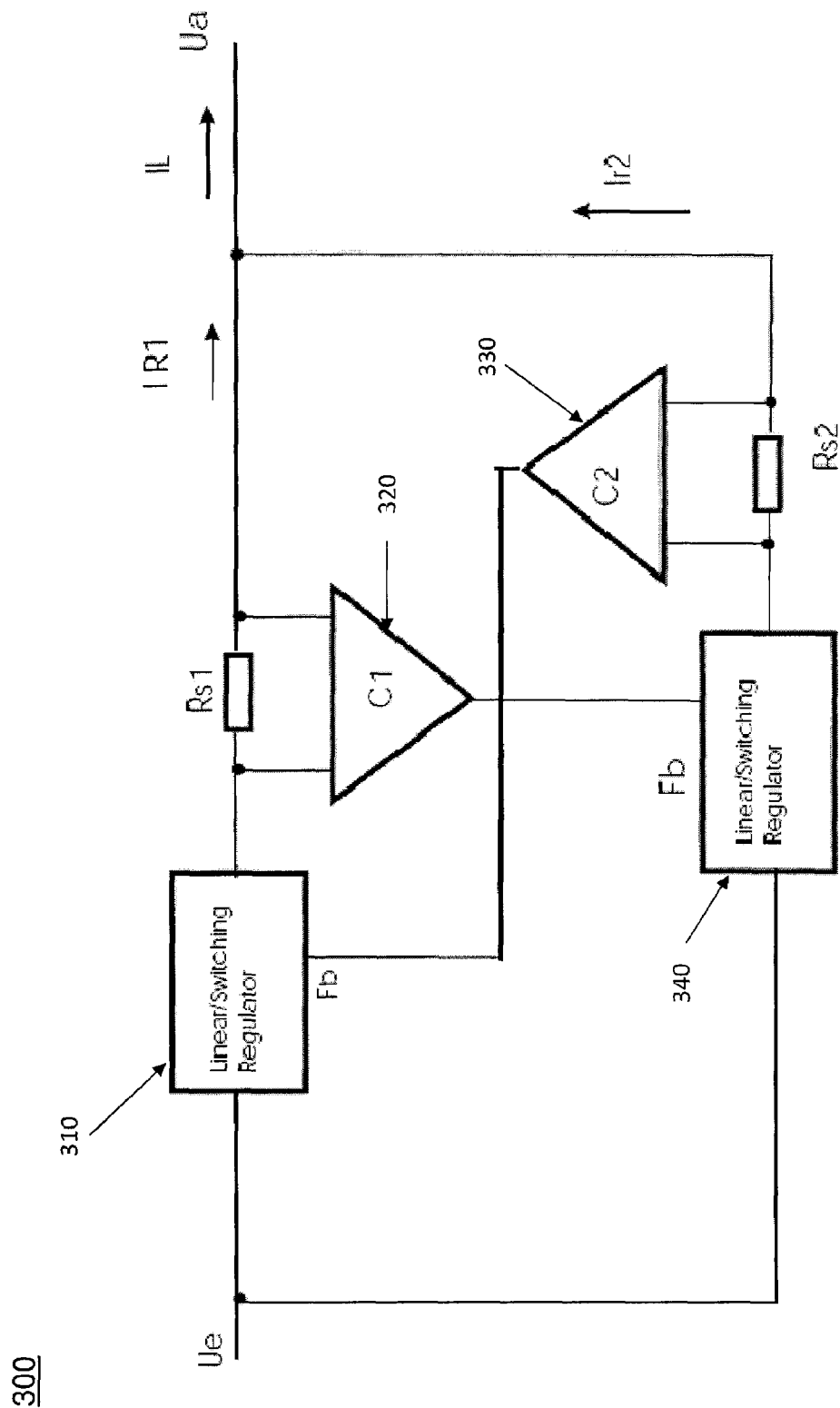
FIG. 3 illustrates an exemplary power supply 300 for providing a continual output and a pulse output.

For first control circuit 230 and second control circuit 240, input parameters regarding a continuous load or pulse load are determined by the input into linear regulator 210 and switching regulator 220, respectively. FIG. 3 illustrates an exemplary power supply 300. Exemplary power supply similarly includes first control circuit 330 and second control circuit 340.

Referring to FIG. 3, in another exemplary embodiment, power supply 300 is configured for where first control circuit 330 and second control circuit 340 receive respective input parameters regarding a continuous load or pulse load determined by an output of the linear regulator 310 and the switching regulator 320, respectively. That is, first control circuit 330 and second control circuit 340 are provided after the linear regulator 310 and the switching regulator 320, respectively.

Figure 4:
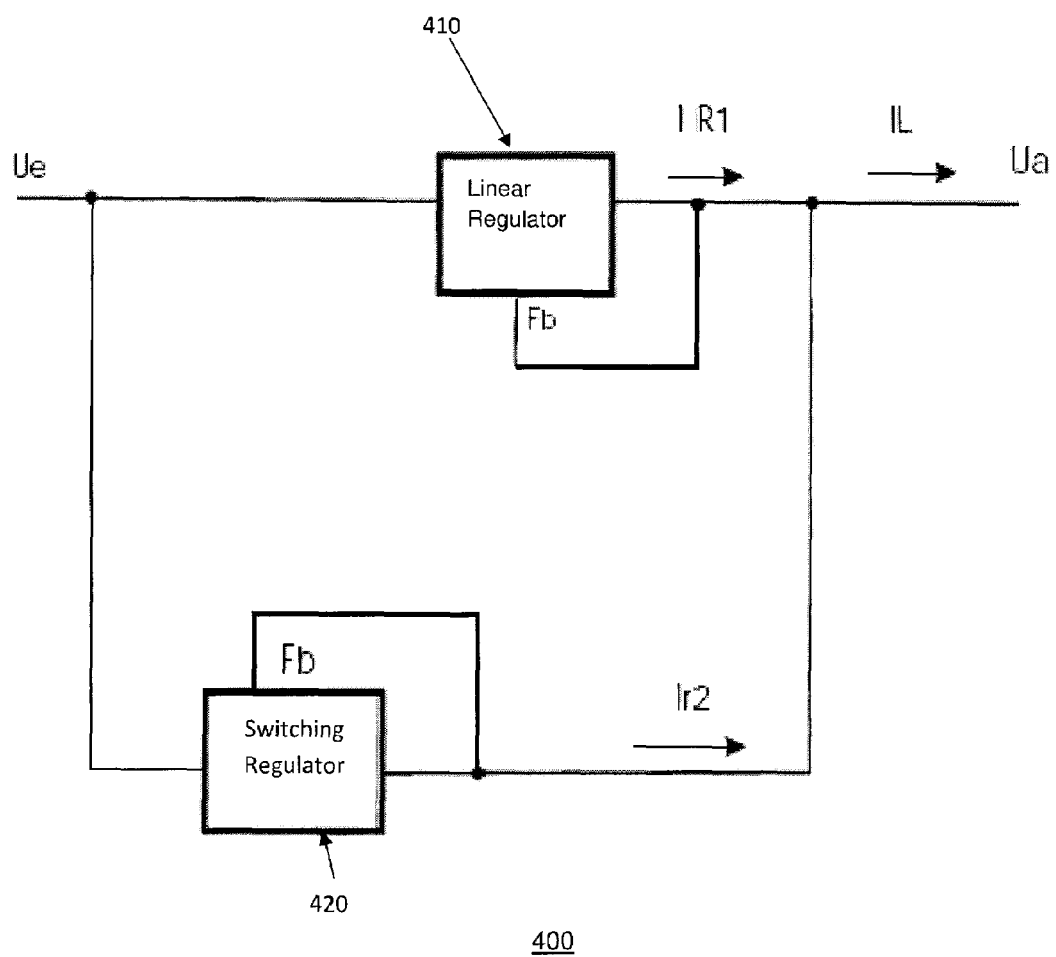
FIG. 4 illustrates an exemplary power supply 400 for providing a continual output and a pulse output.

On the other hand, FIG. 4 illustrates an exemplary power supply 400. Referring to exemplary power supply 400, determination of the currents is determined by feedback Fb for each of linear regulator 410 and switching regulator 420.

Referring to power supply 400, in an example where switching regulator 410 has an output voltage adjusted to 5.1V and a current limit set to 1.2 A and linear regulator 420 has an output voltage set to 5.0 V. With the load conditions of a 1 A continuous load and a 10 A pulse load, switching regulator 410 supplies a continuous load IR1 while the linear regulator 420 is configured to remain inactive. In particular, an output of linear regulator 420 is overdriven. However, as soon as the pulse load occurs, switching regulator 410 goes into a current limit and the voltage breaks down to 5.0V and linear regulator 420 can then supply the additional current to keep the output voltage at 5.0V.

Figure 5:
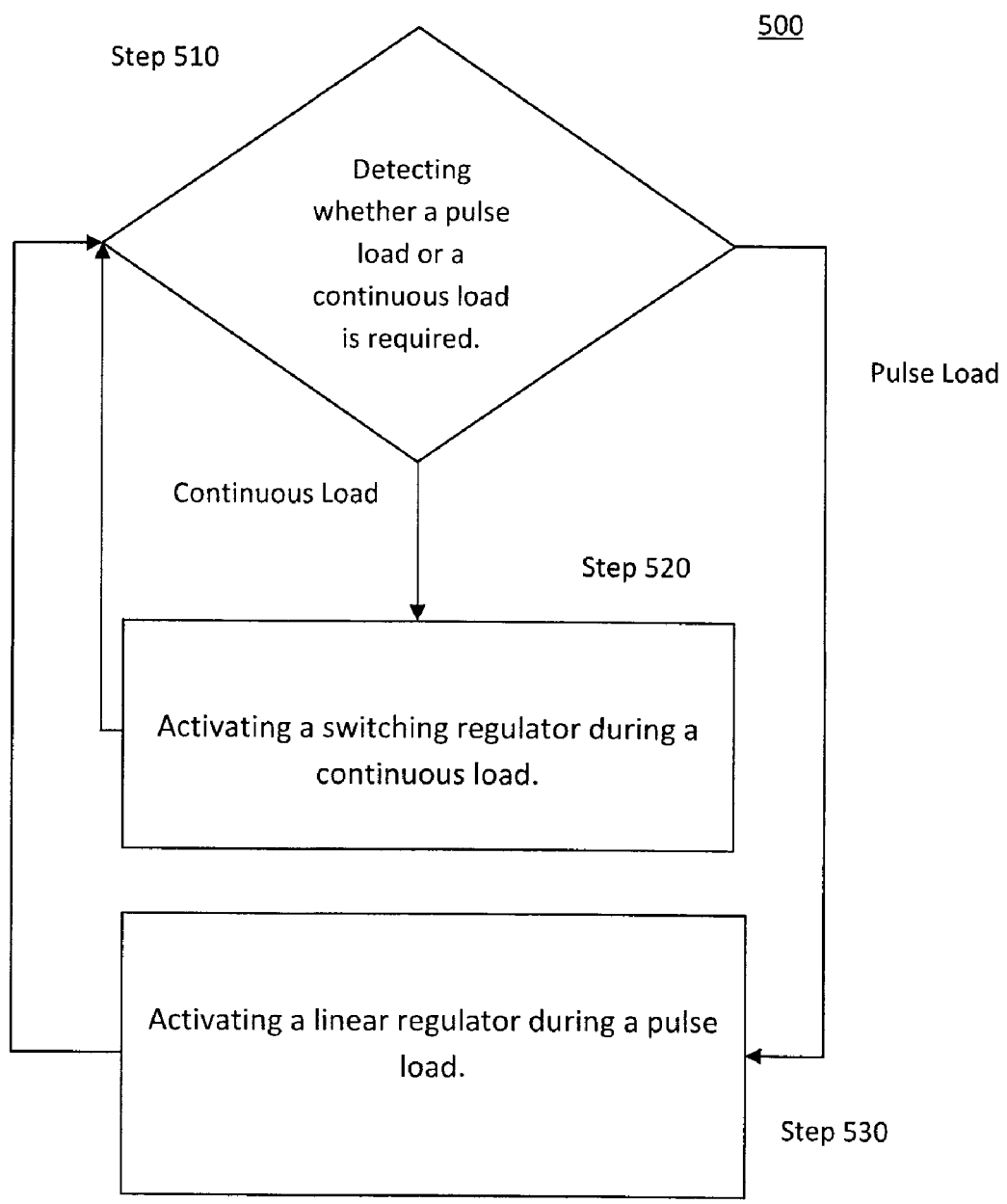
FIG. 5 illustrates an exemplary method 500 for providing a continuous output and pulse output.

In another exemplary embodiment, a method to provide a continuous load and a pulse load is provided. Referring to FIG. 5, a method 500 is exemplarily illustrated. Step 510 includes detecting whether a pulse load or a continuous load is required. If a pulse load is detected, method 500 proceeds to step 520 which includes activating a linear regulator during the pulse load. After activating the linear regulator, method 500 returns to detecting step 510.

If a continuous load is detected, method 500 proceeds to step 520 that includes activating a switching regulator during a continuous load. After the switching regulator is activated, method 500 returns to step 510 for detecting either of the continuous load or pulse load.

While the invention has been described in terms exemplary embodiments, those skilled in the art will recognize that the invention can be practiced with modification within the spirit and scope of the appended claims.

Further, it is noted that, Applicants' intent is to encompass equivalents of all claim elements, even if amended later during prosecution.

Having thus described my invention, what we claim as new and desire to secure by Letters Patent is as follows:

1. A power supply configured to receive and provide a 10V input, 5V output with a continuous load of 1 A load current and a pulse load duration of 2 ms and a pulse load of 10 A load current, comprising:

a switching regulator configured to provide a continuous current, the switching regulator comprising a current limit of 1.2 A;

a linear regulator associated with the switching regulator; and a control circuit configured to direct the linear regulator to provide a minimal current when the power supply is at a continuous load, and to direct the linear regulator to provide a remaining portion of a pulse load current from the continuous load of the switching regulator, wherein the control circuit, in a condition that a noise-free mode is demanded, deactivates the switching regulator and directs the linear regulator to provide the continuous current.

* * * * *